Figure 1:
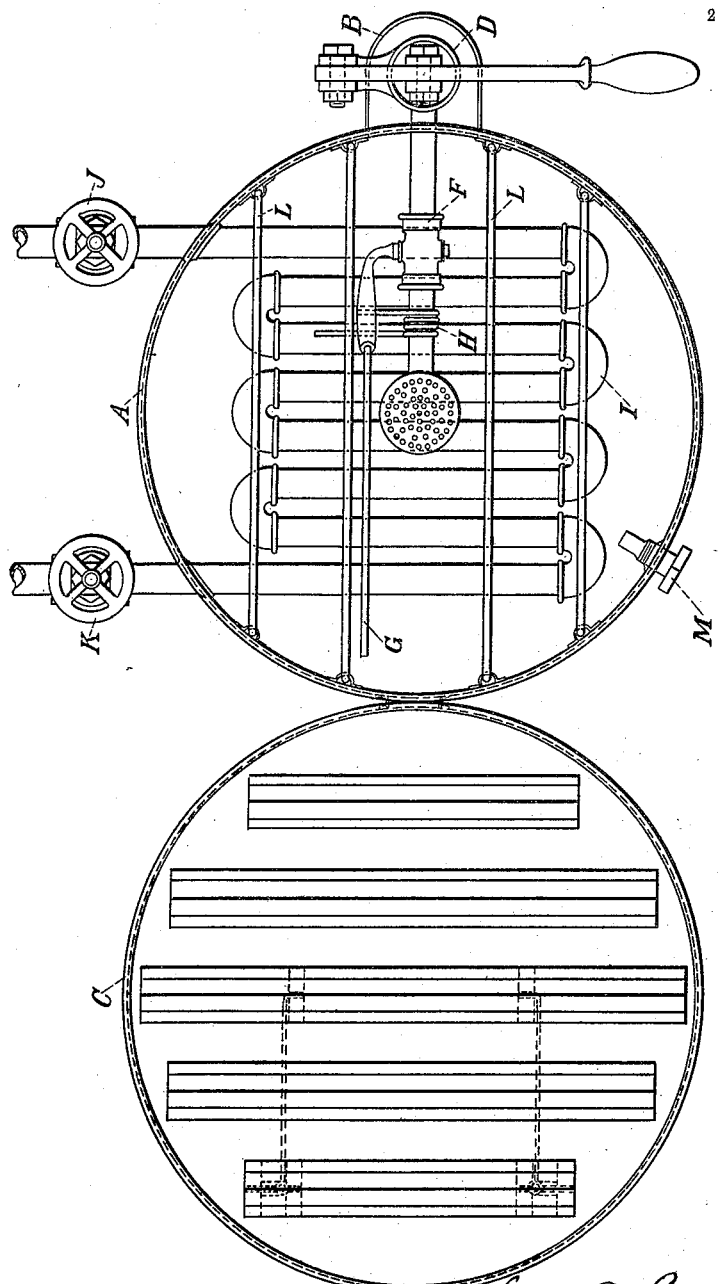

L. A. ROGERS.
DEVICE FOR SPRAYING PARAFFIN ON BUTTER TUBS.
APPLICATION FILED NOV. 2, 1908.

914,605.

Patented Mar. 9, 1909.
2 SHEETS—SHEET 1.

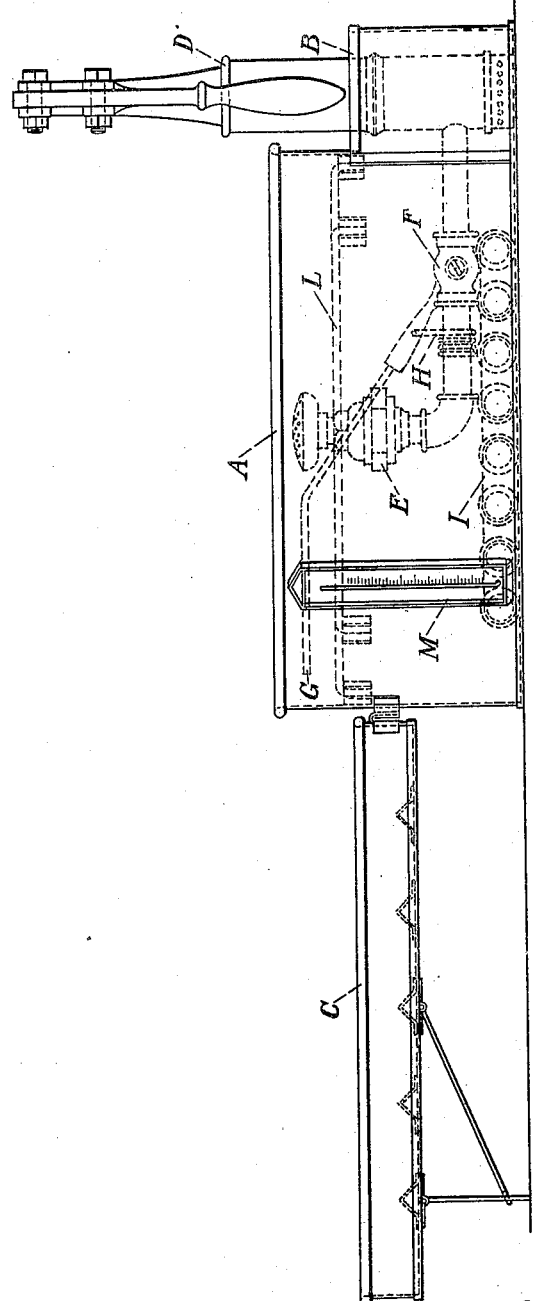

UNITED STATES PATENT OFFICE.

LORE A. ROGERS, OF CHEVY CHASE, DISTRICT OF COLUMBIA.

DEVICE FOR SPRAYING PARAFFIN ON BUTTER-TUBS.

No. 914,605.      Specification of Letters Patent.      Patented March 9, 1909.

Application filed November 2, 1908. Serial No. 460,783.

(DEDICATED TO THE PUBLIC.)

*To all whom it may concern:*

Be it known that I, LORE A. ROGERS, an employee of the United States Department of Agriculture, residing at Chevy Chase, in the District of Columbia, (whose post-office address is Chevy Chase, Maryland,) have invented a new and useful Device for Spraying Paraffin on Butter-Tubs.

This application is made under the act of March 3, 1883, Chapter 143 (22 Stat., 625), and the invention herein described and claimed may be used by the Government of the United States or any of its officers or employees in the prosecution of work for the Government, or by any person in the United States, without payment to me of any royalty thereon.

This invention relates to a machine for applying paraffin to butter tubs and the like.

The object of the invention is to produce an inexpensive machine for use in spraying paraffin on butter tubs in order to prevent butter packed therein from accumulating mold.

It is well known that moldy butter comes from tubs contaminated with mold before the same are packed, and that such condition does not arise from moldy refrigerators where such packed tubs are placed for keeping. When molds grow on butter they not only give it an unsightly appearance, but bring about changes in its composition which seriously affect its flavor. Mold spores are so well distributed that it is impossible to secure tubs, boxes or liners entirely free from contamination. If the wood is well seasoned and is stored in a dry place, these spores will not germinate, but if the tubs or boxes are made from imperfectly seasoned lumber or become damp through improper storage, the spores will germinate and the contamination will be very much increased. It has been ascertained that the most satisfactory method for preventing butter tubs from becoming moldy is to coat the inside of the tub with a thin layer of paraffin. The paraffin not only destroys the molds on the tub, but also leaves a surface on which molds cannot grow.

Therefore, the purpose of my invention is to produce a machine which will properly spray paraffin on butter tubs, and one which will be cheap of construction and easily and safely operated.

The nature, characteristic features and scope of the invention will be more readily understood from the following description taken in connection with the accompanying drawings, forming a part hereof, wherein, Figure 1 is a top view of apparatus embodying features of the invention. Fig. 2 is a side elevation of same.

Referring to the drawings, A represents a galvanized iron tank, and B represents a smaller galvanized-iron tank, having an unobstructed opening into the larger tank A. In tank B is securely fastened an ordinary plumber's force pump D. The inlet is through perforations at the base of the pump, D, and the discharge through the check valve, E. Located at the bottom of the tank A is a steam heating coil, I, provided with an inlet valve J and an outlet valve K. The four cross-rods L L, support the inverted tub.

F represents the cut-off valve. The lever handle is extended by a rod G. The spring, H, is so adjusted that the valve is closed when the machine is in use.

To operate the tank it should be filled with paraffin until the heating pipes are well covered. The valve, J, is then opened, also the outlet valve, K, sufficiently to allow the water of condensation to escape. A high temperature is obtained in this way, and the paraffin may be heated in a short time to the desired temperature, which is regulated by opening or closing the valve J. The temperature should be not less than 240° F. and the temperature can be easily ascertained or determined by an angle thermometer located at M. When the paraffin is hot, a tub is set bottom up on the rods L L. The weight of the tub presses down the lever rod G, opening the valve F, and a few strokes of the pump sprays the paraffin over the inside of the tub. The tub is then set to drain on the inverted cover C. The paraffin which drains into the cover can be put back into the tank.

The valve, F, may be considered unnecessary, but it serves a useful purpose in that it prevents children or other curiously inclined people from spraying hot paraffin into their faces.

The check valves should be preferably made of metal as hot paraffin soon destroys leather. The diameter of the tank A should be slightly greater than the top of a 60-pound tub. The other dimensions of the machine will depend largely upon the size of the pump used.

Having thus described my invention, I claim,—

1. An apparatus such as described, comprising a receptacle, means for supporting a tub in inverted position, a valve for supplying paraffin, and automatic means responding to the position of the tub for opening said valve.

2. An apparatus such as described, comprising a receptacle, a paraffin supply, a valve and a force pump controlling the same, a heating coil, device for supporting a tub in inverted position, and automatic means operated by the weight of the tub for opening said valve.

3. An apparatus such as described, comprising a main tank and an auxiliary communicating tank, means for heating paraffin in the main tank, a force pump in the auxiliary tank and a connection extending therefrom into the main tank and embodying a controlling valve and a spraying device, means for supporting the tub in inverted position in proximity with said spraying device, and automatic means responding to the position of the tub for operating said valve.

In testimony whereof, I affix my signature in the presence of two subscribed witnesses.

LORE A. ROGERS.

Witnesses:
OTIS H. GATES.
LAURENCE H. GREEN.